(No Model.) 2 Sheets—Sheet 1.

L. SCHIERSTEDT.
TWO WHEELED VEHICLE.

No. 399,288. Patented Mar. 12, 1889.

Witnesses
W. Rossiter
Otto Lubkerd

Inventor,
Louis Schierstedt
By Wm L. Lotz
Atty.

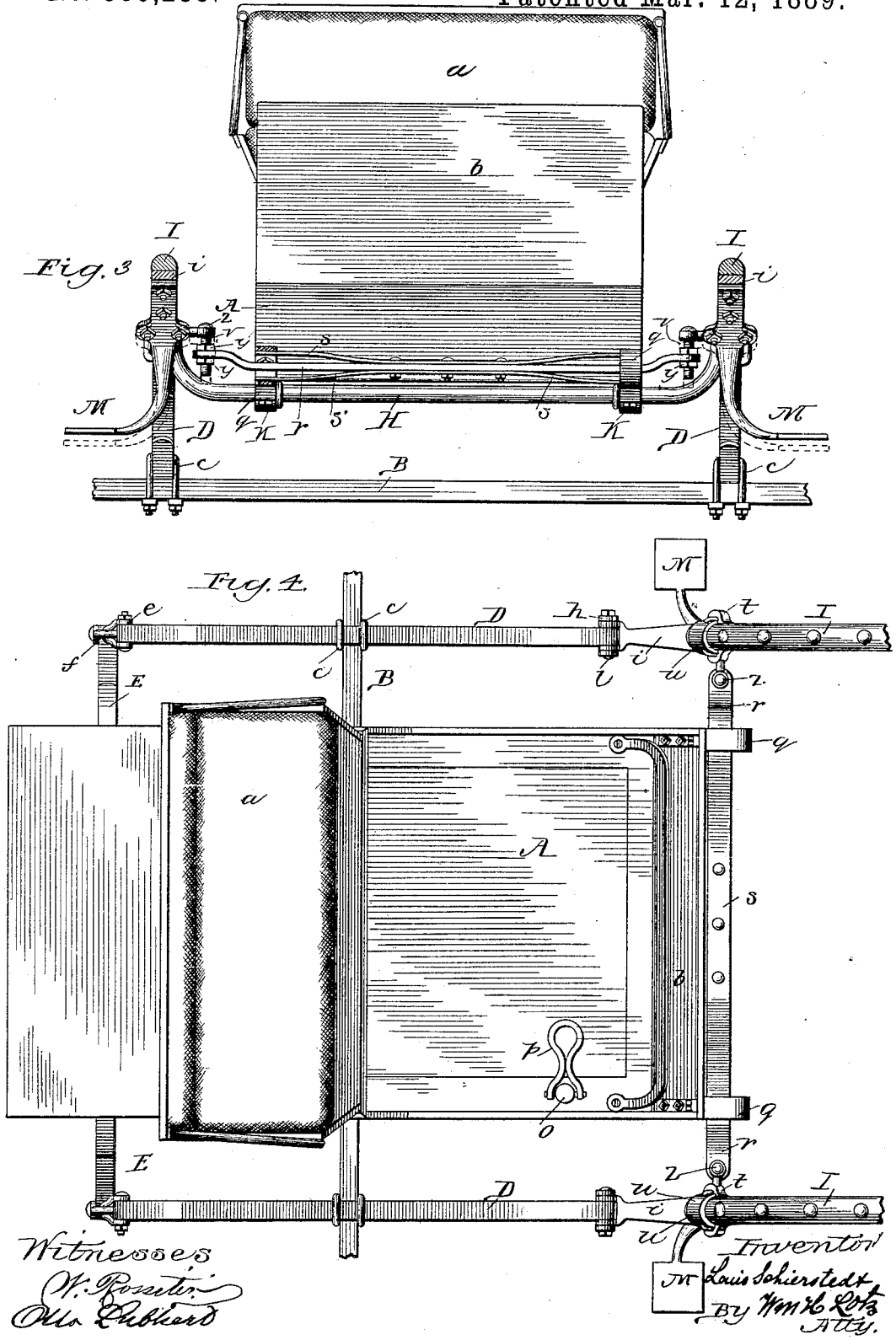

UNITED STATES PATENT OFFICE.

LOUIS SCHIERSTEDT, OF CHICAGO, ILLINOIS.

TWO-WHEELED VEHICLE.

SPECIFICATION forming part of Letters Patent No. 399,288, dated March 12, 1889.

Application filed November 27, 1888. Serial No. 292,038. (No model.)

*To all whom it may concern:*

Be it known that I, LOUIS SCHIERSTEDT, a citizen of the United States of America, residing at Chicago, in the county of Cook and State of Illinois, have invented certain new and useful Improvements in Two-Wheeled Vehicles, of which the following is a specification, reference being had therein to the accompanying drawings.

This invention has for its object certain improvements in two-wheeled vehicles by which the body and seat of the vehicle can be adjusted longitudinally relative to the axle; and with these objects in view my invention consists of the novel devices and combinations of devices hereinafter described and specifically claimed.

Figure 1:
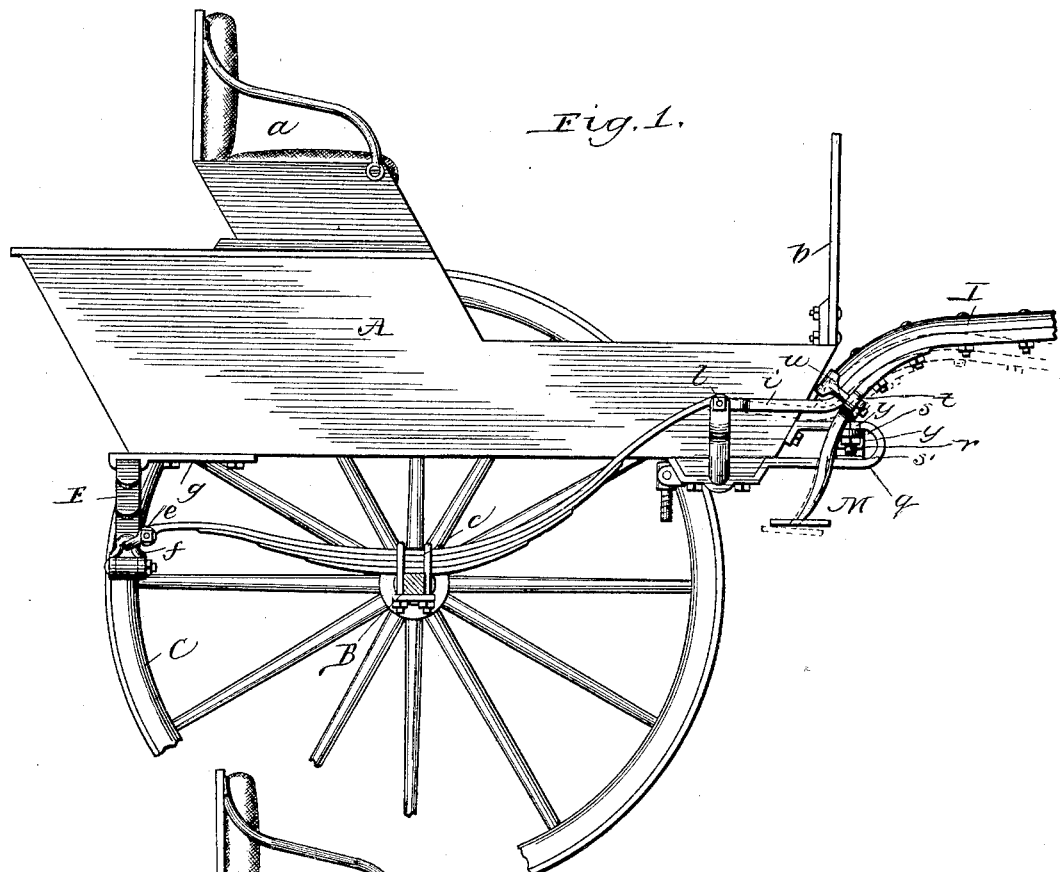
Figure 2:
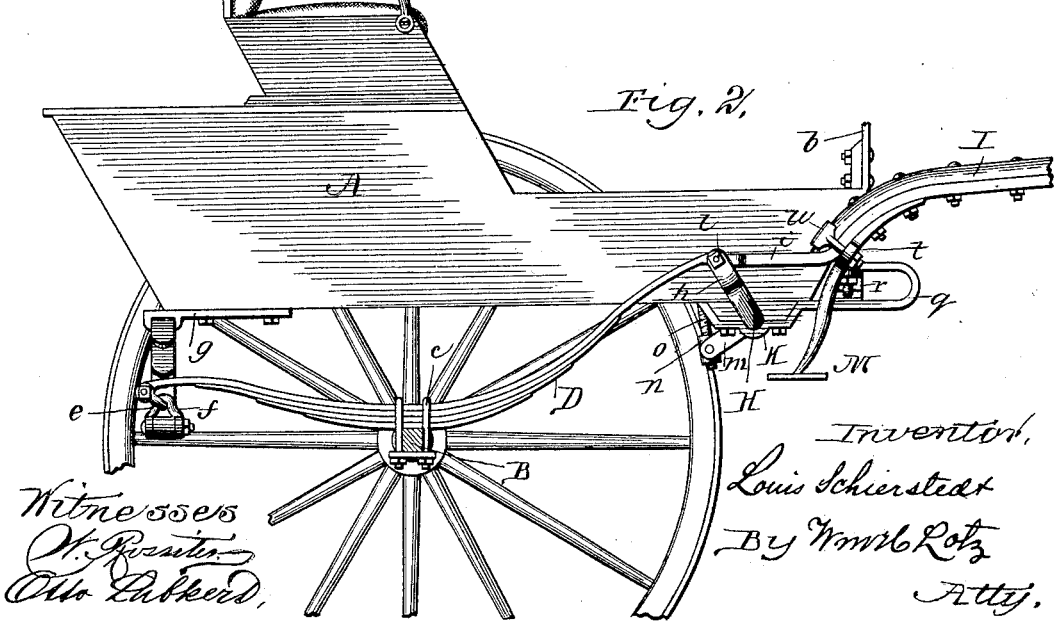

In the accompanying drawings, Figures 1 and 2 represent side elevations of the vehicle on the two opposite adjustments; Fig. 3, a front elevation, and Fig. 4 a plan of the same.

Corresponding referential characters designate like parts in all the figures.

A denotes the vehicle body or box with the seat $a$ and dash-board $b$.

B is the axle, and C the vehicle-wheels. Upon this axle B, near each wheel-journal, is secured the middle portion of a semi-elliptical spring, D, by U-bolts $c$, in a manner that its portion extending forward of the axle B is somewhat longer than its rearwardly-extending portion. The rear end of each spring D has a pivotally-coupled loop, $e$, and these loops $e$ of both springs D are linked with the pivotal end loops, $f$, of a semi-elliptic spring, E, secured transversely under the rear of the body or box by a coupling-plate, $g$. The forward ends of spring D enter the forked and eyed upwardly-bent ends $h$ of a shaft, H, supported in journal-boxes K under the forward end of the body or box A, and to these ends $h$ is also coupled the bifurcated end of the extension-bar $i$ of thill I, the three parts D, $h$, and $i$ being connected by a pivot-pin, $l$. This shaft H has also a rigid crank, $m$, inside of one of its journal-boxes K, between the bifurcated ends of which is secured a swivel-nut, $n$, engaging a screw, $o$, projecting through the bottom of the body A, with its head inside the body, to be in easy reach of the driver, and this head of screw $o$ has pivotally secured a lever, $p$, by which it can be turned in either direction without the use of a wrench. With swinging the crank $m$ upward by means of screw $o$, the vehicle-body A, relative to the axle B, is pushed and held rearward, as shown by Fig. 1, and with swinging the crank $m$ downward, as shown by Fig. 2, the vehicle-body is drawn forward, all of which with this device can be done by a person occupying the seat of the vehicle.

To the forward end of the vehicle-body A is rigidly secured at each corner a horizontal forwardly-extending loop, $q$, and through these loops is placed a transverse bar, $r$, having riveted to each side of its middle a spring-bar, $s$ and $s'$, the outwardly-curved ends of which bear against the top and bottom faces of loops $q$ to hold the bar $r$ yieldingly on a central position in such loops $q$. The ends of bar $r$ have eyes, each engaged by a bolt, $v$, adjustably secured by two nuts, $y$, with its upper head end engaging the eyed end of a plate, $t$, secured to thill I by a U-strap, $u$. This bar $r$ thus yieldingly holds the vehicle-body A on proper line with the thills I, so the trotting movement of the horse will not be imparted to the body or seat, at the same time permitting adjustment by screws $v$ to make the vehicle suitable for large or small horses, with the body A to remain as near as possible on the same level. The loops $q$ will allow sufficient play for the bar $r$ and springs $s\ s'$ to slide longitudinally forward and backward therein with the adjustment of the vehicle-body A relative to axle B, which, as stated before, is arranged for balancing the weight of the occupants upon the axle. The ascending steps M are secured to thills I to form part thereof.

In place of screw $o$ and nut $p$ for swinging crank-arm $m$, and thereby moving body A relative to axle B, a lever or other well-known device may be applied to accomplish the same object, and therefore I do not wish to be restricted to the device shown; and instead of coupling the rear extensions, $i$, of thills I with cranks $h$ of shaft H the same may be coupled to the body of the vehicle, and for some kinds of two-wheeled vehicles it may be desirable to have the crank-arms $h$ of shaft H below the body of the vehicle and the loops *q* also underneath the body A, so as not to interfere with getting into the vehicle, all of which changes may be made without deviating from my invention.

What I claim is—

1. In a two-wheeled vehicle, the combination of body A, side springs, D, secured upon axle B, transverse spring E, secured under the rear end of body A and coupled with its ends to the rear ends of springs D, rocker-shaft H, pivoted under the forward end of body A and having end cranks, *h*, coupled with the forward ends of springs D, and crank *m*, having swivel-nut *n*, engaging screw *o*, projected through the body A of the vehicle, to be adjusted from above by means of a swiveled lever, *p*, or by an equivalent device, all substantially as described, for the purpose specified.

2. In a two-wheeled vehicle, the combination, with the above-claimed elements, of loops *q*, secured to or under the forward end of body A and forming guides for a bar, *r*, and spring-bars *s* and *s′*, secured to the top and bottom of such bar *r*, the ends of which being coupled to the thills to hold them yieldingly in line with the body A, all substantially as set forth.

3. In a two-wheeled vehicle, the ends of thills I, pivotally coupled to any part of the vehicle-body, in combination with loops *q*, holding a bar, *r*, with springs *s s′*, secured against the top and bottom of the same for yieldingly holding it centrally therein, and with the eyed ends of said bar *r* being adjustably coupled to the thills by vertical screws *v*, secured by nuts *y y*, all substantially as set forth, for the purpose specified.

In testimony whereof I affix my signature in presence of two witnesses.

LOUIS SCHIERSTEDT.

Witnesses:
WILLIAM H. LOTZ,
OTTO LUBKERT.